United States Patent [19] [11] Patent Number: 5,038,209
Hang [45] Date of Patent: Aug. 6, 1991

[54] ADAPTIVE BUFFER/QUANTIZER CONTROL FOR TRANSFORM VIDEO CODERS

[75] Inventor: Hsueh-Ming Hang, Howell, N.J.

[73] Assignee: AT&T Bell Laboratories, Murray Hill, N.J.

[21] Appl. No.: 589,124

[22] Filed: Sep. 27, 1990

[51] Int. Cl.$^5$ .............................................. H04N 7/13
[52] U.S. Cl. ..................................... 358/136; 358/135
[58] Field of Search ....................... 358/136, 135, 133; 341/200

[56] References Cited

U.S. PATENT DOCUMENTS

| | | | |
|---|---|---|---|
| 4,672,441 | 6/1987 | Hoelzlwimmer et al. | 358/135 |
| 4,689,672 | 8/1987 | Furukawa et al. | 358/136 |
| 4,941,043 | 7/1990 | Jass | 358/136 X |
| 4,958,226 | 9/1990 | Haskell et al. | 358/135 X |

OTHER PUBLICATIONS

"Draft Revision of Recommendation H.261 Video Codec for Audiovisual Services at px64 kbit/s", Source: WP XV/1, CCITT, Study Group XV, Geneva, Jul. 16-27, 1990.
"Description of Ref. Model 8 (RM8)", Source: Specialist Group on coding for Visual Telephony, CCITT SGXV, Working Party XV/4, Document 525, 1989.
"a Multiprocessor Based Low Bitrate Video Codec Architecture and a Well-Adapted Two Phase Software Coding Strategy", T. Kummerow, et al., SPIE, vol. 1199 Visual Comm. and Image Processing IV (1989).
"A Low-Bit-Rate Interframe Coder for Videotelephone", B. G. Haskell, et al., Bell System Technical Journal, vol. 54, No. 8, 1975.
"Fixed and Adaptive Predictors for Hybrid Predictive/Transform Coding", S. Ericsson, IEEE Transactions on Communications, vol. Com-33, No. 12, Dec. 1985.

Primary Examiner—Victor R. Kostak
Attorney, Agent, or Firm—Thomas Stafford

[57] ABSTRACT

A buffer/quantizer controller in a video coder utilizes the average quantization step size employed for the previous frame, the average number of bits produced per pel by the video coder for the image contained in the previous frame and current frame buffer fullness level to obtain an indication of image complexity. A target current frame quantization step size to be employed by the video coder in encoding a current frame is based on the indication of image complexity. Optionally, the target frame quantization step size is adjusted by a mapping procedure, at a predetermined intervals within each frame period, to account for the current buffer fullness. The map employed by the mapping procedure is adjusted in accordance with the target frame quantization step size.

15 Claims, 4 Drawing Sheets

ADAPTIVE BUFFER/QUANTIZER CONTROL FOR TRANSFORM VIDEO CODERS

TECHNICAL FIELD

This invention is related to video image processing and, more particularly, to adjusting the quantization step size so as to regulate the degree of buffer fullness in a video coder.

BACKGROUND OF THE INVENTION

Transform coding techniques and systems for compressing video motion pictures are well-known. One such video coding system is defined in the CCITT recommendation H.261 (P×64 kbps standard). An output buffer and a buffer/quantizer controller are essential elements of this type of video coding system. The output buffer stores encoded information supplied to it in a first-in, first-out manner, typically prior to transmission, and the buffer/quantizer controller regulates the buffer fullness by determining the quantity of information supplied to the buffer. It is required that the output buffer not become so full as to be incapable of accepting additional information beyond what it has already stored since such additional information would be lost. Similarly, it is desirable that the output buffer does not become and/or remain empty because this results in an inefficient utilization of the available bandwidth.

Several methods for adjusting the quantization step sizes and thereby regulating the fullness level of the output buffer have been proposed. However, for certain image types these prior methods may require drastic changes in the value of the quantization step size employed during the compression of a single image frame. This, in turn, results in non-uniform quality when the resulting compressed image contained within the frame is reconstructed. Such non-uniformity in quality creates a displeasing effect that is undesirable to viewers of the reconstructed image.

Other prior methods for regulating quantization step sizes and output buffer fullness explicity compute statistical analyses of the images to be processed. Such methods are capable of producing compressed images which can be reconstructed with nearly uniform quality. However, these prior methods require a large number of computations to perform the necessary analyses which are in addition to those computations needed to accomplish the regular coding process. This requirement of added computations increases the cost of such video coders.

Another problem encountered in employing low bit rate video coding is that the channel rate can at times be insufficient to encode the image contained in each frame with good quality. Thus, a tradeoff may be had between the frame rate, i.e., the number of frames transmitted per second (frames/sec), and the quality of the images contained within those frames. Such a tradeoff may be fixed for an image sequence, i.e., a constant frame rate coding mode is employed, or it may be adaptively specified, i.e., variable frame rate coding mode is employed. A constant frame rate coding mode, although simple to implement, is inefficient because it is incapable of adjusting the coding of an image sequence to match the actual motion content and image complexity of the sequence. Typical prior variable rate coders did not optimize the number of frames coded to achieve the best possible results within given parameters.

SUMMARY OF THE INVENTION

The difficulties with prior buffer/quantizer controllers are overcome, in accordance with an aspect of the invention, by determining a target current frame quantization step size to be employed in encoding a frame based on an indication of image complexity. The image complexity is determined from the average quantization step size employed for a previous frame, the average number of bits produced per pel by the video coder for the image contained in the previous frame and the current frame output buffer fullness level. The target frame quantization step size is also adjusted by an optional mapping procedure, at predetermined intervals within each frame time interval, so as to account for the current output buffer fullness. As a result of this mapping adjustment, an actual frame quantization step size to be employed is generated. A mapping procedure for generating an actual frame quantization step size may employ a map that is adjusted in accordance with the target frame quantization step size.

BRIEF DESCRIPTION OF THE DRAWING

In the Drawing.

A simplified block diagram of an exemplary transform video encoder is shown in FIG. 1.

Figure 3:
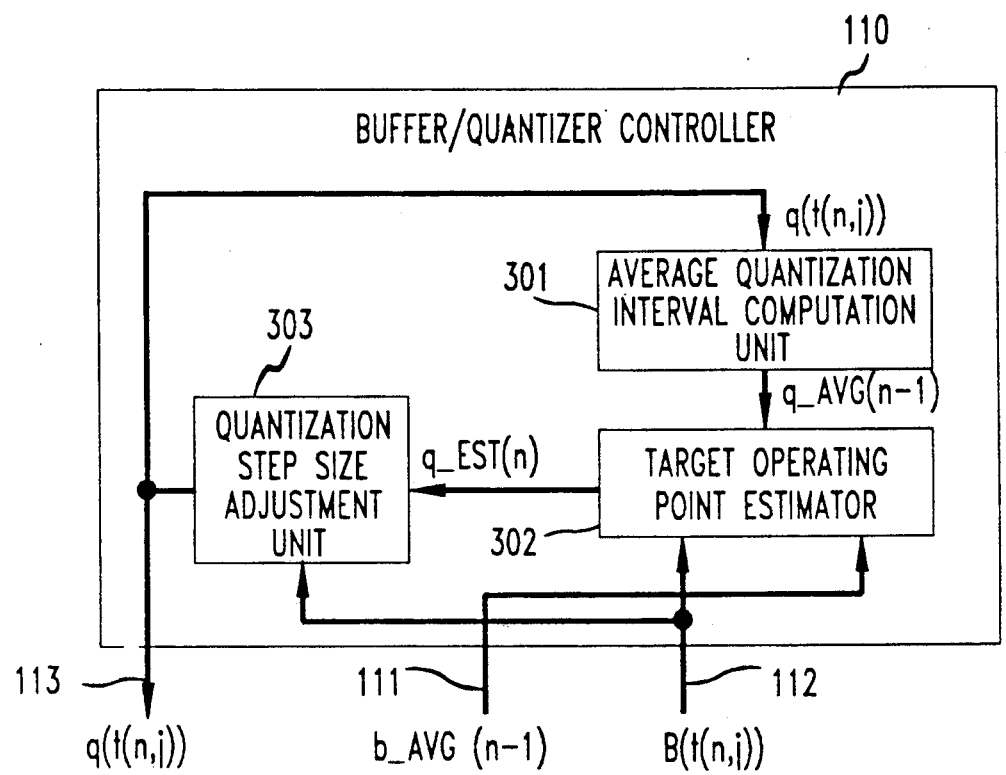
Figure 4:
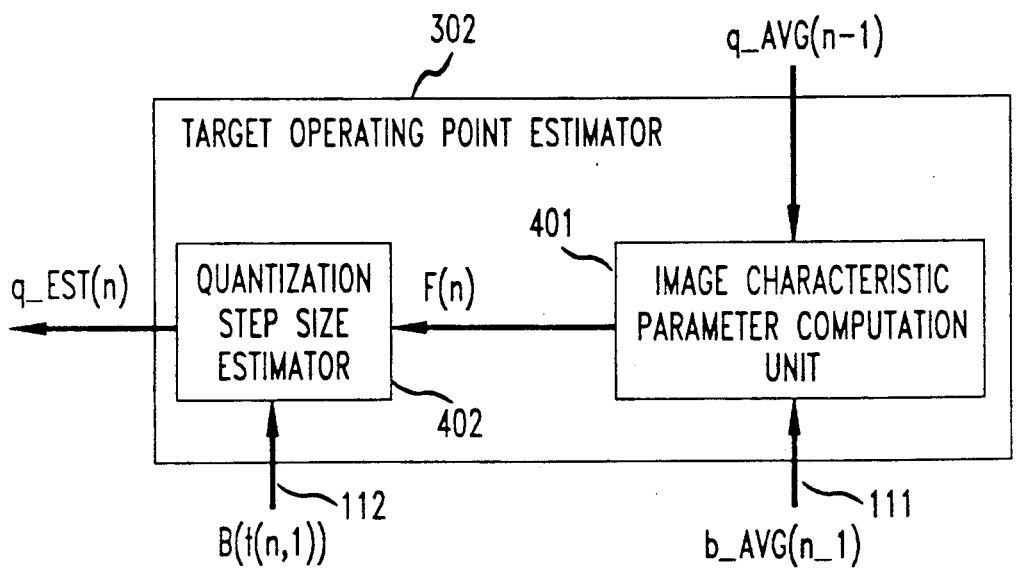
Figure 5:
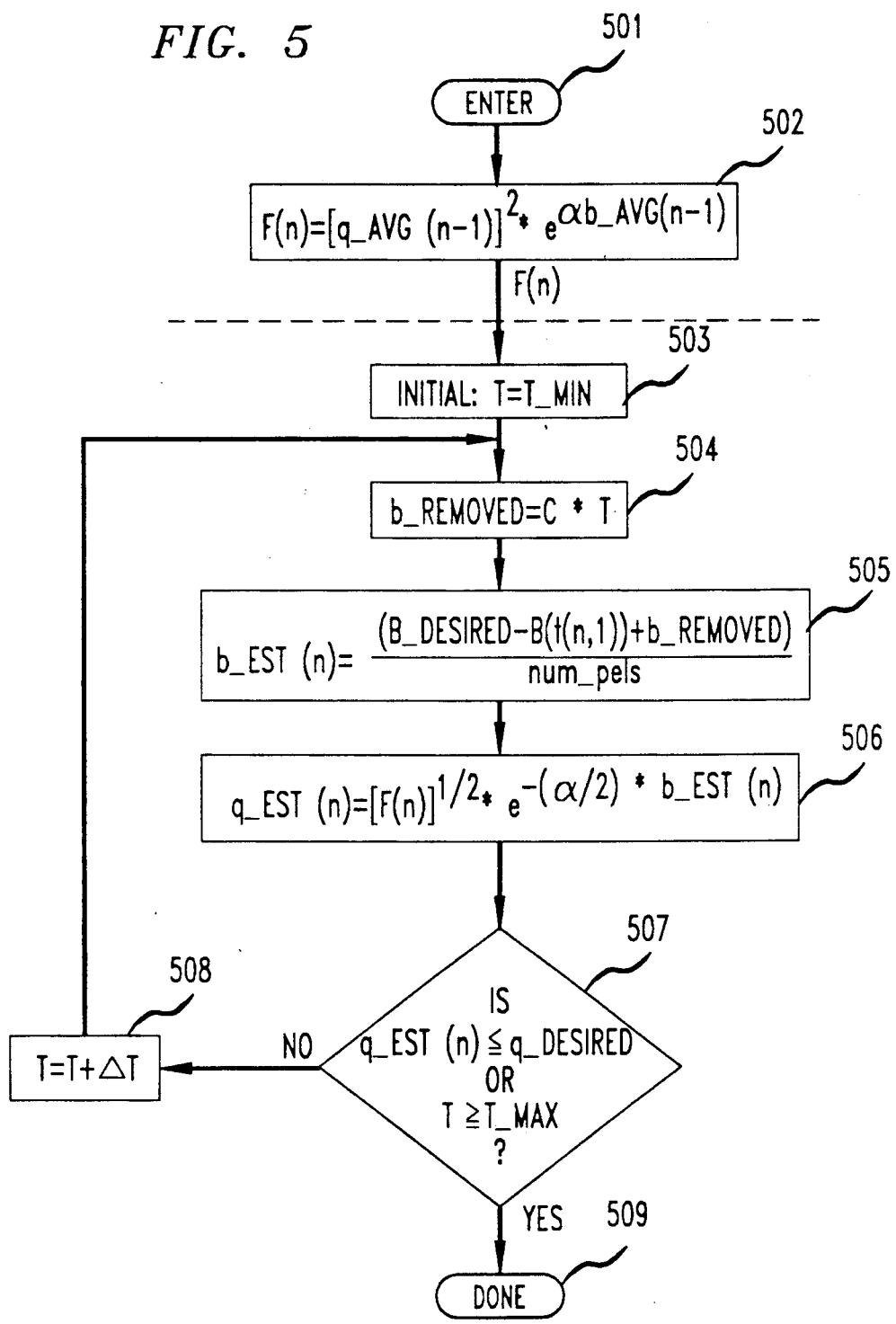
Figure 6:
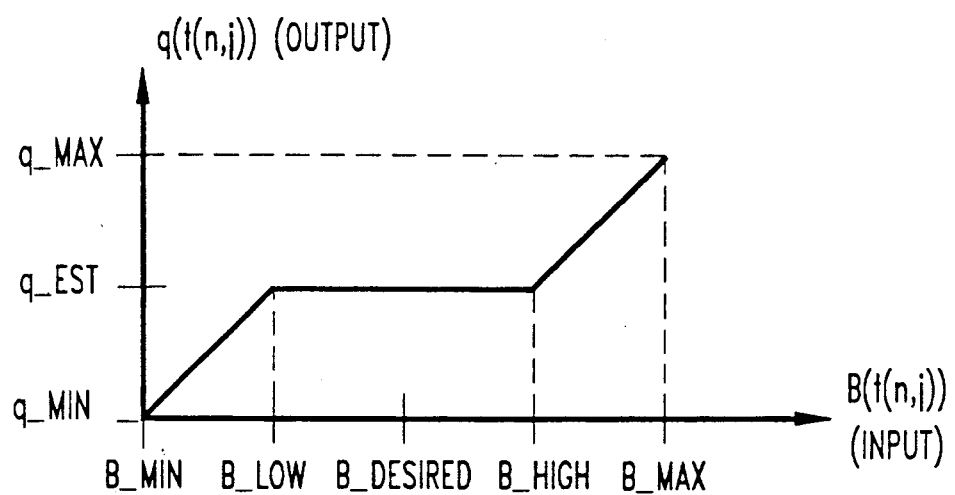

Shown in FIG. 3, in simplified block diagram format, is an exemplary buffer/quantizer controller;

Shown in FIG. 4, in simplified block diagram format, is an expanded view of target operating point estimator;

FIG. 5 illustrates, in flow chart form, the operation of a target operating point estimator; and Shown in FIG. 6 is an exemplary mapping characteric employed by a quantization step size adjustment unit.

DETAILED DESCRIPTION

Figure 1:
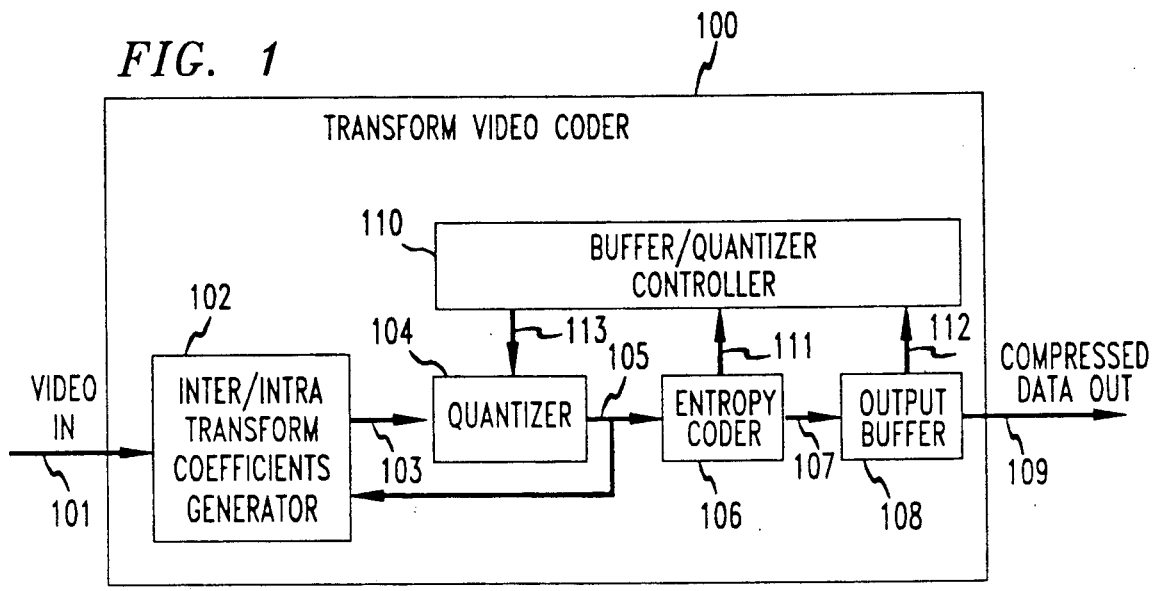

A simplified block diagram of exemplary transform video coder 100 is shown in FIG. 1. A digital image sequence signal VIDEO IN 101 is supplied as input to inter/intra transform coefficients generator 102 which derives and supplies as an output signal 103 comprised of blocks of transform coefficients of either original image values or interframe differences. Typically, a Discrete Cosine Transform (DCT) is used to transform spatial domain signals (image pels or frame differences) into frequency domain coefficients. Transform coefficient generators and the techniques employed therein, e.g., conditional replenishment or motion compensation, are well-known.

The transform coefficients in signal 103, from inter/intra transform coefficients generator 102, are supplied to quantizer 104, wherein the coefficients are selected and quantized in order to reduce the transmission bit rate. The value of the quantization step size employed by quantizer 104 controls the quality of images reconstructed from the quantized transform coefficients, as well as, the number of bits needed for reconstruction. Additionally, the number of transform coefficients to be transmitted is typically controlled by quantizer 104, which employs a coefficient selection procedure that is regulated by the quantization step size. Such selection procedures are well known. Quantized coefficients 105 are supplied to entropy coder 106 wherein they are further compressed. Output bit stream 107, which is comprised of the compressed coefficients supplied by entropy coder 106, is stored in output buffer 108. These compressed coefficients are supplied by output buffer 108 as signal compressed data out 109, which may be transmitted over a communication channel. Output buffer 108 is required because the number of bits generated by entropy coder 106 varies significantly at different areas of an image sequence. Output buffer 108 stores the bit stream comprised of the compressed coefficients temporarily, in a first-in, first out-fashion. Additionally, output buffer 108 regulates the output bit rate of signal compressed data out 109 so as to match a subsequent receiver of the signal, e.g., a channel.

In order to generate the interframe differences, in either the spatial domain or in the frequency domain, quantized coefficients 105 are fed back to inter/intra transform coefficients generator 102. The operations of quantizer 104, entropy coder 106, and output buffer 108 are synchronized in time and are well-known.

Figure 2:
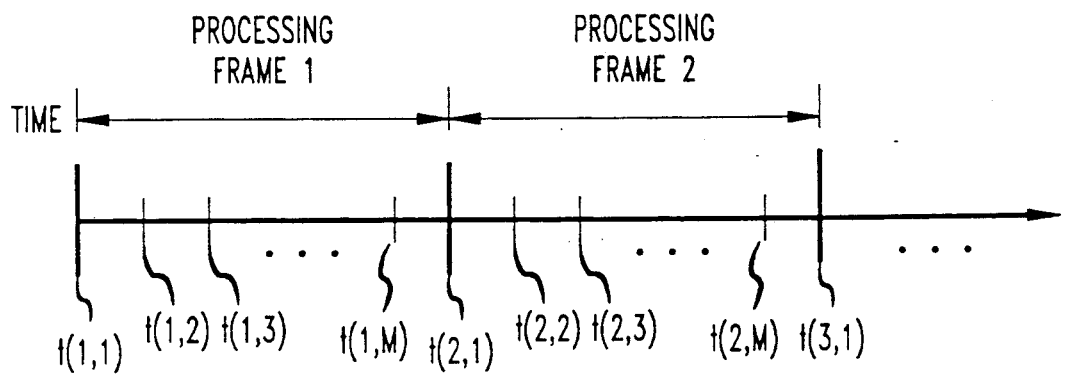
FIG. 2 illustrates the notation of time instances employed.

FIG. 2 illustrates the notation of time instances employed. Two exemplary frames are shown and the time scale of each is noted. In general terms, the data of any image frame number n is processed between time $t(n,1)$ to $t(n+1,1)$ which represents one frame time period. Buffer/quantizer controller 110 generates M adjustments of the quantization step size during the time from $t(n,1)$ to $t(n,M)$. In accordance with an aspect of the invention, buffer/quantizer controller 110 at the beginning of processing frame n, i.e., $t(n,1)$, generates an estimated quantizer step size, $q\_EST(n)$, which, if employed for each time interval of frame n, is predicted to result in output buffer 108 being filled to a predetermined level desired by the implementor, B$\_$DESIRED. Operation of quantizer 104 such that at each time interval quantization step size $q\_EST(n)$ is actually employed and output buffer 108 is filled to level B$\_$DESIRED is defined to be the target operating point for frame n. Additionally, in accordance with an aspect of the invention, at each time instance $t(n,j)$ between and including $t(n,1)$ and $t(n,M)$ a quantization step size that is actually used by quantizer 104 for that time interval is determined by buffer/quantizer controller 110. The derivation of the quantization step size actually employed from the target operating point is via a mapping process that will be described in more detail below. Although in this example and the those below M is fixed, this should not be construed as a limitation and it is not beyond the scope of this invention for M to vary from frame to frame.

In accordance with an aspect of the invention, buffer/quantizer controller 110 (FIG. 1) is supplied by entropy coder 106 with the average number of bits per pel, $b\_AVG(n-1)$ 111, employed in frame $n-1$, i.e., the previous frame. Additionally, the current buffer fullness $B(t(n,j))$ at each time interval j is supplied as signal $B(t(n,j))$ 112 by output buffer 108. The quantization step size for each time interval $q(t(n-1,j))$ is employed to derive an average quantization step size for frame $n-1$, namely $q\_AVG(n-1)$. In accordance with another aspect of the invention buffer/quantizer controller 110 generates for each interval $t(n,j)$ a quantization step size $q(t(n,j))$ 113 which is supplied as output to be utilized by quantizer 104. The interval M is chosen so that buffer/quantizer controller 110 adjusts the quantization step sizes frequently enough so that output buffer 108 does not overflow or underflow and the quantization step size is maintained nearly constant for the entire image contained within the frame. Maintaining the quantization step size nearly constant for the entire image results in an image quality that is nearly uniform throughout.

Shown in FIG. 3, in simplified block diagram format, is an exemplary buffer/quantizer controller 110 (FIG. 1). Average quantization step size computation unit 301 is supplied with each quantizer step size and computes an average quantization step size for the prior frame $n-1$. Each such average is computed prior to the start of processing of frame n. The average may be computed by storing previous values of the quantization step sizes or on a running basis. The average is reinitialized to zero and computed independently for each frame.

Once each frame, at time $t(n,1)$, the average number of bits per pixel used to encode frame $n-1$, $b\_AVG(n-1)$ 111, the average quantization step size used to encode frame $n-1$, $q\_AVG(n-1)$, and $B(t(n,1))$ 112, the output buffer 108 level at time $t(n,1)$ are supplied, in accordance with an aspect of the invention, to target operating point estimator 302. Target operating point estimator 302 computes an estimate of the target operating point for quantizer 104 (FIG. 1) by determining target quantization step size $q\_EST(n)$ for the selected target buffer fullness level B$\_$DESIRED. Target quantization step size $q\_EST(n)$ is thereafter supplied to quantization step size adjustment unit 303. Operation of target operating point estimator 302 is described in more detail below. Additionally, in accordance with an aspect of the invention, quantization step size adjustment unit 303 performs a mapping based on $q\_EST(n)$ from the supplied fullness level at $t(n,j)$ of output buffer 108, $B(t(n,j))$ 112, to the actual quantization step size to be used between time $t(n,j)$ and $t(n,j+1)$, $q(t(n,j))$ 113. The nature of this mapping will be described further below.

Shown in FIG. 4, in simplified block diagram format, is an expanded view of target operating point estimator 302. As shown, target operating point estimator 302 is comprised of image characteristic parameter computation unit 401 and quantization step size estimator 402. In brief, image characteristic parameter computation unit 401 obtains an estimate of the expected complexity of the current image $F(n)$. Thereafter, quantization step size estimator 402 employs this estimate of image complexity and the current buffer fullness level to determine the estimated quantization step size, $q\_EST(n)$.

FIG. 5 illustrates, in flow chart form, the operation of target operating point estimator 302 (FIG. 3). The routine is entered via step 501 at the beginning of each frame. In step 502 the image characteristic parameter of frame n, $F(n)$, is computed according to $F(n)=[q\_AVG(n-1)]^2 \cdot e^{a \cdot b\_AVG(n-1)}$, where $\alpha$ is a coder dependent parameter, e.g., 1.39. The image characteristic parameter of a frame is an indication of the complexity of the image contained within the frame. Steps 501 and 502 are performed by image characteristic parameter computation unit 401 (FIG. 4).

Thereafter, a loop is begun in step 503 by initializing T, the estimated time duration for processing a frame. The value of T is set to T$\_$MIN, the minimum time that can be allotted for processing to encode a frame. Typically T$\_$MIN is the time required to process frames containing the simplest images. The number of bits to be removed from output buffer 108 by virtue of having been transmitted to the channel is calculated by $b\_REMOVED = C \cdot T$ in step 504. C is the channel bit rate (bits/sec). C could be a fixed value if this encoder is designed to operate at only a single channel rate, or C may be a value negotiated between the encoder and the channel (and possibly the decoder), if this encoder can operate at several bit rates. T_MIN is selected by the implementor, e.g., T_MIN=1/30 sec, although such a choice may be restricted by hardware devices.

The number of bits per pel available to encode frame n, namely b_EST(n), is estimated in step 505 by $$b\_EST(n) = \frac{B\_DESIRED - B(t(n,1)) + b\_REMOVED}{num\_pels},$$

where B_DESIRED is the desired level for output buffer 108 (FIG. 1), which is typically half of the buffer size (B_MAX) and num_pels is the total number of pels in frame n, which is often a fixed value for a specific coder. The estimated average quantization step size for frame n, which is the target quantization step size q_EST(n), is thereafter obtained in step 506 by q_EST(n)=F(n)$^{1}$·e−α/2·b_EST(n). Conditional branch point 507 tests if q_EST(n) is less than the desired quantization step size q_DESIRED, which is selected by the implementor to maintain a reasonable picture quality, or if the T value is greater than T_MAX, the longest permissible duration between two frames as selected by the implementor. If the test result in step 507 is NO, control is passed to step 508 wherein the value of T is increased by ΔT, a value selected by the implementor which is typically the duration of an input frame. Thereafter, control is passed to step 504 to repeat the loop. If the test result in step 507 is YES, control is passed to step 509 which exits the routine. q_EST(n) may then be supplied as output. Steps 503 through 509 are performed by quantization step size estimator 402 (FIG. 4)

If the constant frame rate coding mode is desired, T_MIN can be set to the desired frame duration and T_MAX set equal to T_MIN. This will cause the loop comprised of steps 503 through 508 to be executed only once. Alternatively, the implementor can design a stopping condition test for step 507 based on the combination of both q_EST(n) and T. For example, one may choose to exit the loop when q_EST(n) is close to q_DESIRED and T is close to T_MAX, although neither condition is met exactly. If variable frame rate coding is employed and if T is greater than the time necessary to process the current frame, at least one subsequent frame will be discarded. Methods of discarding subsequent frames and for assuring that a corresponding decoder does not become dysfunctional because of such discarding are well known.

For processing the first input frame, n=1, q_EST(1) is chosen by the implementor, since b_AVG(0) and q_AVG(0) are not available. Typically, q_EST(1) is chosen appropriately to match the channel bit rate C. For a large value of C, a small value may be chosen for q_EST(1). Also, for frame n=1, the implementor may desire to use a different mapping characteristic in quantization step size adjustment unit 303 (FIG. 3) discussed below.

Shown in FIG. 6 is an exemplary mapping characteristic employed by quantization step size adjustment unit 303 (FIG. 3). The exact shape of this mapping characteristic (curve) is determined by the implementor. The target operating point of buffer/quantizer controller 110 is the point at which current estimated quantization step size q_EST(n) has the value expected to be employed for an entire frame time period so that the fullness level of output buffer 108 (FIG. 1) is maintained at a predetermined desired level, B_DESIRED, selected by the implementor. Thus, the target operating point is defined by the point (q_EST(n), B_DESIRED) on the mapping characteristic. Therefore, the preferred operating condition is such that when the level of output buffer 108, B(t(n,j)) 112, is in the neighborhood of B_DESIRED, the quantization step size employed is approximately q_EST(n). Because of variations in the image, however, it is desirable to decrease the quantization step size q(t(n,j)) 113, when B(t(n,j)) 112 is lower than B_LOW to avoid underflow in output buffer 108. Similarly, when B(t(n,j)) 112 is higher than B_HIGH, it is desirable to increase the quantization step size q(t(n,j)) 113 to avoid buffer overflow. Therefore, at each of the M time intervals in a frame, the actual buffer fullness level of output buffer 108 is checked. If the fullness level of output buffer 108 is greater than B_LOW and less than B_HIGH the quantization step size employed is q_EST(n), in accordance with FIG. 6. Should the fullness level of output buffer 108 exceed B_HIGH, the actual quantization step size employed is increased from the value of q_EST(n), in accordance with FIG. 6, up to the maximum quantization step size possible, q_MAX. Likewise, in the event that the fullness level of output buffer 108 is less than B_LOW, the actual quantization step size employed is reduced from the value of q_EST(n), in accordance with FIG. 6, down to the minimum quantization step size possible, q_MIN. The exact shape of this mapping characteristic may also be constrained by the available quantization step sizes, e.g., only even numbers between and including 2 to 64 may be used in accordance with CCITT recommendation H.261. For each value q_EST(n), a different mapping characteristic may be selected or one exemplary mapping characteristic may be modified in a predetermined manner prior to performing the mapping.

Additionally, in order to prevent buffer overflow, quantizer 104 may have to select not to pass any of the coefficients to output buffer 108 when it is determined that output buffer 108 is nearly full (close to B_MAX). Similarly, in the case of buffer underflow, it may be necessary for buffer/quantizer controller 110 to send information to entropy coder 106 so that the latter can insert stuffing bits into the compressed bit stream. However, proper selection by the implementor of the mapping characteristic and the mechanisms for estimating the complexity of each image greatly reduces the probability of the above mentioned problems arising.

I claim:

1. Apparatus for dynamically determining a quantization step size for a video coder wherein said video coder is processing at least a portion of at least one video signal comprised of frames wherein each frame contains at least one image representation, comprising:
   quantizer means for quantizing a digital signal representing said video signal comprised of frames;
   means for obtaining an average quantization step size employed by said quantizer means in a previous frame;
   buffer means for storing a quantized version of said digital signal representing said video signal comprised of frames;
   means for obtaining an indication of fullness from said buffer means; and
   means responsive to said average quantization step size and said fullness indication for generating an estimated target quantization step size for said digital signal.

2. The apparatus as defined in claim 1 wherein said means for generating includes means for deriving an initial estimated target quantization step size and means for revising said initial estimated target quantization step size into said estimated target quantization step size which reflects an allotment of additional time for processing a frame.

3. The apparatus as defined in claim 1 wherein said means for obtaining an average quantization step size includes means for obtaining each quantization step size employed in said previous frame and means for computing an average of said received quantization step sizes.

4. The apparatus as defined in claim 1 further including means for obtaining an average number of bits produced per pel by said video coder in a previous frame.

5. The apparatus as defined in claim 4 wherein said means for generating is further responsive to said average number of bits produced per pel.

6. The apparatus as defined in claim 1 further including means responsive to said estimated target quantization step size for generating at predetermined intervals an adjusted quantization step size.

7. The apparatus as defined in claim 6 wherein said means for generating said adjusted quantization step size includes means for mapping said estimated target quantization step size into said adjusted quantization step size.

8. The apparatus as defined in claim 7 wherein said means for mapping is responsive to said obtained buffer fullness level and a mapping characteristic to yield said adjusted quantization step size.

9. The apparatus as defined in claim 7 wherein said means for mapping determines said mapping characteristic in a manner responsive to said estimated target quantization step size.

10. The apparatus as defined in claim 9 wherein said means for mapping further includes means for selecting said mapping characteristic at predetermined intervals from a predetermined set of mapping characteristics.

11. The apparatus as defined in claim 10 wherein said selection is based on said estimated target quantization step size.

12. A method for dynamically determining a quantization step size for a video coder wherein said video coder is processing at least a portion of at least one video signal comprised of frames wherein each frame contains at least one image representation and said video coder includes at least quantizer means for quantizing a digital signal representative of said video signal and buffer means for storing a quantized version of said digital signal representative of said video signal, comprising the steps of:

obtaining an average quantization step size employed by said quantizer means in a previous frame;

receiving an indication of fullness from said buffer means; and generating an estimated target quantization step size, responsive to said average quantization step size and said fullness indication, for said digital signal.

13. The method as defined in claim 12 further including the step of generating at predetermined intervals an adjusted quantization step size responsive to said estimated target quantization step size.

14. The method as defined in claim 12 further including the step of obtaining an average number of bits produced per pel by said video coder in a previous frame.

15. The method as defined in claim 14 wherein said step of generating is further responsive to said average number of bits produced per pel.

* * * * *